(12) United States Patent
Stanforth

(10) Patent No.: US 8,323,593 B2
(45) Date of Patent: Dec. 4, 2012

(54) PROCESS FOR SOLUBILIZING, REDUCING AND FIXING HEXAVALENT CHROMIUM CONTAINED IN CHROMITE ORE PROCESSING RESIDUE INTO TRIVALENT CHROMIUM

(75) Inventor: Robert Stanforth, Madison, WI (US)

(73) Assignee: TRC Environmental Corporation, Windsor, CT (US)

( * ) Notice: Subject to any disclaimer, the term of this patent is extended or adjusted under 35 U.S.C. 154(b) by 0 days.

(21) Appl. No.: 13/153,083

(22) Filed: Jun. 3, 2011

(65) Prior Publication Data

US 2012/0053388 A1    Mar. 1, 2012

Related U.S. Application Data

(63) Continuation-in-part of application No. 12/628,494, filed on Dec. 1, 2009, now abandoned.

(60) Provisional application No. 61/118,692, filed on Dec. 1, 2008.

(51) Int. Cl.
     *C02F 1/00*          (2006.01)
(52) U.S. Cl. ............................................. 423/53; 423/55
(58) Field of Classification Search .................. 423/659, 423/53, 55; 436/83, 175; 209/10; 134/2; 588/400, 412, 313, 315
See application file for complete search history.

(56) References Cited

U.S. PATENT DOCUMENTS

| | | | | |
|---|---|---|---|---|
| 4,954,168 A * | 9/1990 | Crnojevich et al. | ............. | 423/55 |
| 5,202,033 A * | 4/1993 | Stanforth et al. | .......... | 405/128.5 |
| 5,397,478 A * | 3/1995 | Pal et al. | ........................ | 210/710 |
| 5,562,588 A * | 10/1996 | Higgins | ........................ | 588/256 |
| 6,607,474 B2 * | 8/2003 | Chowdhury | .................. | 210/631 |
| 6,758,633 B2 * | 7/2004 | Yen | .............. | 405/128.5 |
| 6,833,124 B2 * | 12/2004 | Phelps et al. | .................... | 423/55 |
| 6,955,501 B2 * | 10/2005 | Yen | .......... | 405/128.75 |
| 2007/0088188 A1* | 4/2007 | Wazne et al. | ................. | 588/256 |
| 2007/0098502 A1* | 5/2007 | Higgins et al. | ............. | 405/128.1 |
| 2007/0224097 A1* | 9/2007 | Chisick et al. | .................. | 423/55 |
| 2007/0225542 A1* | 9/2007 | Higgins | ........................ | 588/256 |
| 2008/0103348 A1* | 5/2008 | Tunstall | ........................ | 588/320 |

FOREIGN PATENT DOCUMENTS

WO         99/44056      *    9/1999

OTHER PUBLICATIONS

U.S. EPA, Method 3060A, "Alkaline Digestion of Hexavalent Chromium" Test Methods for Evaluating Solid Wastes, Dec. 1996.*

* cited by examiner

*Primary Examiner* — Steven Bos
(74) *Attorney, Agent, or Firm* — Quarles & Brady LLP

(57) ABSTRACT

Processes for reducing hexavalent chromium, Cr(VI) in a chromite ore processing residue matrix and processes for analyzing and determining effective treatment are disclosed.

18 Claims, 3 Drawing Sheets

PROCESS FOR SOLUBILIZING, REDUCING AND FIXING HEXAVALENT CHROMIUM CONTAINED IN CHROMITE ORE PROCESSING RESIDUE INTO TRIVALENT CHROMIUM

CROSS REFERENCE TO RELATED APPLICATIONS

This application is a continuation-in-part application of U.S. patent application Ser. No. 12/628,494, filed Dec. 1, 2009, now abandoned which claimed the benefit of U.S. Provisional Application No. 61/118,692, filed Dec. 1, 2008. Each application is incorporated herein by reference as if set forth in its entirety.

STATEMENT REGARDING GOVERNMENT INTEREST

Not Applicable

BACKGROUND OF THE INVENTION

Chromite Ore Processing Residue (COPR) is a waste product from historic chromium manufacturing. From the late 1800's to around 1970, hexavalent chromium (Cr(VI)) was produced from chromite ore by a high temperature, alkaline oxidation of the ore and subsequent extraction of sodium chromate with water. Lime (CaO) was used as the base, sodium carbonate was used as a source of both base and sodium ion, and, atmospheric oxygen was the oxidant. (Tinjum J, 2006, Mineralogical properties of chromium ore processing residue and chemical remediation strategies, Ph.D. Thesis (*Civil Env. Eng*) U. Wisc-Madison). The waste contained unreacted chromite ore, various alkaline calcium compounds, and other waste material. Some hexavalent chromium was still present, predominantly trapped in calcium compounds in the waste.

Millions of tons of the waste have been used as landfill material in many areas in the Eastern U.S. (predominantly in New Jersey and Maryland) as well as in Europe. Such waste is highly alkaline, and it contains hexavalent chromium as well as trivalent chromium. Hexavalent chromium leaches out of the waste causing environmental problems. Leaching hexavalent chromium may also render the waste "hazardous" under U.S. EPA regulations. In addition, the waste generates an alkaline leachate and can expand over time, causing heaving problems. (Moon DH et al., 2007, Long-term treatment issues with chromite ore processing residue (COPR): $Cr^{6+}$ reduction and heave *J Hazardous Mat* 143:629-635). These environmental problems have driven the need to clean-up such landfill wastes.

Treatment of COPR has been problematic. Discussion of the problems associated with COPR disposal and treatment studies to remediate them have been conducted and reported for over a decade. (James BR, 1994, Hexavalent chromium solubility and reduction in alkaline soils enriched with chromite ore processing residue, *J Environ Quality* 23:227-233; James BR, 1996, The challenge of remediating chromium-contaminated soil, *Environ Sci Tech* 30:248A-251A; and, Tinjum, 2006). Treatment involves the reduction of hexavalent chromium to the more stable and less toxic trivalent form. While several common approaches exist to reducing hexavalent to trivalent chromium, none have been sufficiently successful with COPR. (Tinjum, 2006).

Treatment of materials contaminated with Cr(VI) involves reducing hexavalent chromium to the trivalent form (Cr(III)). Cr(III) is insoluble in neutral and moderately basic solutions due to the precipitation of $Cr(OH)_3$ (or, if iron is present, as a mixed iron-trivalent Cr oxide). Several reducing agents are commonly used, including ferrous or elemental iron (Rai D et al., 1989, Environmental chemistry of chromium, *Sci. Total Environ.* 86:15-23; Palmer CD et al., 1991, Processes affecting the remediation of chromium-contaminated sites, *Environ. Health Perspectives* 92:25-40; Stanforth RR et al., 1993, In situ method for decreasing metal leaching from soil or waste, U.S. Pat. No. 5,202,033; James, 1994; 1996; Patterson RR et al., 1997, Reduction of hexavalent chromium by amorphous iron sulfide, *Environ. Sci Tech* 31:2039-2044; Fendorf S et al., 2000, Chromium transformations in natural environments: the role of biological and abiological processes in chromium (VI) reduction, *International Geology Review* 42:691-701; US EPA, In situ Treatment of Soil and Groundwater Contaminated with Chromium, EPA 625/R-00/004, Office of Research and Development, US EPA, Cincinnati Ohio. (2000)); and reduced sulfur species (Palmer and Wittbrodt, 1991; Patterson et al., 1997; Fendorf, et al. 2000; US EPA, 2000).

It is reported in Rai et al. (1989) (a review article on the environmental chemistry of chromium) that Cr(VI) can be reduced to Cr(III) by many reductants, including ferrous iron and sulfide. Palmer and Wittbrodt (1991) report that ferrous iron or sulfide can be used for reducing Cr(VI). Patterson et al (1997) reports the use of amorphous ferrous sulfide for reducing Cr(VI) in soils and water. The US EPA has stated that ferrous iron must be present for sulfide to reduce Cr(VI), and that iron sulfide needs to be present to reduce Cr(VI) in groundwater (US EPA 2000). Thus, treatment of Cr(VI)-contaminated material with ferrous iron, reduced sulfur species, or the combination of the two is a well-established concept.

Several reducing agents have been tried on COPR, such as ferrous iron (Geelhoed J S et al., Identification and geochemical modeling of processes controlling leaching of Cr(VI) and other major elements from chromite ore processing residue, *Geochimica Cosmochimica Acta* 66:3927-3942, (2002); Dermatas D M et al., 2006, Ettringite-induced heave in chromite ore processing residue (COPR) upon ferrous iron treatment, *Environ Sci Tech* 40:5786-5792; and, Moon 2007), reduced sulfur species (e.g. sulfide or polysulfide) (Wazne M et al., 2007, Assessment of calcium polysulfide for the remediation of hexavalent chromium in chromite ore processing residue (COPR), *J Hazardous Mat* 143:620-628; Tinjum, 2006; and Carlblom, L H et al., In-situ chemical reduction of hexavalent chrome at chromite ore processing residue sites, May 2008, Presented at Sixth International Battelle Conference on Remediation of Chlorinated and Recalcitrant Compounds, Monterey, Calif.), ferrous sulfate and sodium dithionate (Su C M et al., 2005, Treatment of hexavalent chromium in chromite ore processing solid waste using a mixed reductant solution of ferrous sulfate and sodium dithionate, *Environ Sci Tech* 39:6208-6216), manganese (II) (James 1994), metallic iron (Lai K C K et al., 2008, Removal of chromium (VI) by acid-washed, zero-valent iron under various groundwater geochemistry conditions, *Environ Sci Tech* 42:1238-1244), pyrite leachate (Chowdhury A, 2003, Method for stabilizing chromium-contaminated compounds, U.S. Pat. No. 6,607,474 B2 and Tinjum 2006), and organic reductants, such as acetic or ascorbic acid (James 1996).

U.S. Pat. No. 5,202,033 to Stanforth et al. report that hazardous wastes or soils containing Cr(VI) can be treated in-situ through the application of ferrous sulfate to reduce chrome. This method has been shown to be ineffective for COPR. (Geelhoed J S et al., 2003, Chromium reduction or release?

Effect of Fe(II) sulfate addition on chromium (VI) leaching from columns of chromite ore processing residue, *Environ Sci Tech* 37:3206-3213).

Higgins T E (Process for the in-situ bioremediation of Cr(VI)-bearing solids) reports that in-situ bioreduction can be used for treating Cr(VI) containing solids, involving the steps of contacting the solids with bacteria, nutrients and water with the pH maintained between 6.5 and 9.5. (U.S. Pat. No. 5,562,588). However, this method would be inappropriate for COPR due to the highly alkaline nature of the COPR and the inherent toxicity of the metals in COPR towards bacteria.

U.S. Pat. No. 6,578,633 to Yen C Y entitled In-situ process for detoxifying hexavalent chromium in soil and groundwater and U.S. Pat. No. 6,955,501 to Yen C Y entitled In-situ process for detoxifying hexavalent chromium in soil and groundwater report a method for the in-situ treatment of Cr(VI) in soil and water by spreading a reducing agent on top of the contaminated area and adding water to infiltrate the reducing agent into the contaminated zone. Among the reducing agents mentioned are ferrous salts, sulfide salts, sodium thiosulfate and organic reducing agents. However, in-situ injection of ferrous sulfate has been reported to be ineffective for COPR due to the rebound effect. (Geelhoed et al, 2003). It is reasonable to conclude that other agents would also be ineffective for COPR.

US Publ. Application No. 2007/0088188 to Wazne et al. entitled Method of treatment, stabilization and heave control for chromite ore processing residues (COPR) and chromium contaminated soils reports adding acid to COPR to consume excess alkalinity so as to reduce the pH to below pH 10, and then adding a reducing agent to the COPR to reduce Cr(VI). While not being specific to these additives, Wazne et al. suggests using carbonated water as a source of acid, and ferrous iron, sulfide, or polysulfide as a reducing agent. The amount of alkalinity in some COPR would require large amounts of acid, such that the treated material would be turned into a slurry where a liquid acid is used. That also makes working with the material much more difficult since, under the US EPA regulations, landfilled solids must be free of liquids in order to pass the paint filter test.

US Publ. Application No. 2007/0098502 to Higgins T E et al., entitled In-situ treatment of in-ground contamination reports introducing ferrous iron and sulfide in a liquid state into the pores of COPR or a Cr(VI) contaminated aquifer. Insoluble ferrous sulfide that forms acts as an ongoing reducing agent for any Cr(VI) that may leach out of the COPR or pass through in the groundwater.

US Publ. Application No. 2007/0224097 to Chisick et al. entitled Methods of treatment of chromite ore processing residue report the use of sulfide ion and ferrous ion to reduce Cr(VI).

Current treatment processes fail to reduce sufficient hexavalent chromium in the waste to eliminate Cr(VI) so that it does not leach from COPR. Over time, concerning the treatment methods that have been tested in the field, chrome and alkalinity slowly leach out of the untreated areas resulting in increased pH and increased hexavalent chromium concentration, which is referred to as the "rebound effect." It has been reported that ferrous iron is not a successful reductant for Cr(VI) in COPR because the high pH present in the COPR causes ferrous iron to precipitate as a hydroxide, which is unavailable for reducing Cr(VI). (Brown et al. 2008, and Geelhoed et al., 2003).

A further challenge associated with treating COPR is the lack of a reliable analytical tool to assess effective removal of hexavalent chromium from within the COPR matrix. For example, the alkaline digestion test (EPA SW846 method 3060A, a/k/a alkaline digestion test) now used by regulatory agencies does not accurately measure Cr(VI) remaining in the COPR since excess reductant present in a solid precipitate on the surface of COPR particles immediately reduces Cr(VI) released from the interior of the COPR particles during the alkaline digestion test. Because the excess reductant masks untreated Cr(VI) in the COPR particles, the alkaline digestion test overestimates the effectiveness of treating Cr(VI) in COPR and underestimates the compositional level of Cr(VI) remaining in the COPR particles. It therefore remains challenging to design effective treatment methods for treating Cr(VI) in COPR.

SUMMARY OF THE INVENTION

The present invention expands upon the disclosure of U.S. patent application Ser. No. 12/628,494 (published as US Publication Number 2010/0135876 on Jun. 3, 2010). The '494 application (incorporated above by reference) describes methods for reducing hexavalent chromium (Cr(VI)) in particulate COPR waste matrix. This new application discloses novel analytical methods that provide insights into the reaction kinetics and parameters that influence the treatment process and which directly lead to improved methods for more effectively treating Cr(VI) in COPR waste, also disclosed herein.

In a first aspect, the invention is an analytical method for assessing the compositional level of Cr(VI) in a COPR waste matrix. The analytical method can be employed, inter alia, as a preliminary lab-scale tool when designing a field-scale COPR waste treatment method, or as an after-the-fact monitor of the effectiveness of a field-scale COPR waste treatment method. The analytical method provides information about suitable stoichiometry of the Cr(VI) and the reductants, as well as suitable relative ratios of the reductants. If used as a monitoring process, the analytical method can yield information about the Cr(VI) compositional level of a treated COPR waste that could indicate whether further treatment is warranted.

In the analytical method, COPR waste matrix is treated using first and second reducing agents, of the sort previously described, to release Cr(VI) from the particles into the waste matrix, whereupon some of the Cr(VI) is reduced. In practicing the method using a COPR waste matrix of interest (ground to a convenient size, such as particles that pass through a 0.5 inch sieve), one can vary or hold constant the amount of the reducing agents, and the total amount of reductants relative to the amount of Cr(VI)-containing waste matrix, to ascertain the amounts at which more of any reductant is not advantageous, is no more effective, or is detrimental in a subsequent treatment method. Thereafter, matrix particles sufficiently small that they contain no residual unreduced Cr(VI) after the treating step are sieved out and discarded. Remaining unbound (dissolved) or particulate reducing agents formed in situ, including reducing agent compounds related to the first and second reducing agents that can reduce Cr(VI) upon release from the particles, are removed. Then, the remaining particles from which the very small particles and the reducing agents have been removed are tested in a conventional alkaline digestion test to determine an accurate measure of released Cr(VI). This measure, obtained in the absence of available reducing agents, is more accurate than was previously possible using the alkaline digestion test because, Cr(VI) is not immediately reduced upon release from the particles, so the apparent Cr(VI) level in the particles is not artificially low. By accurately determining the amount of Cr(VI) that was trapped in the particles, one can determine the relevant stoichiometry for reducing agents included in a field-scale treatment method. It is noted that the size to which the particles are ground is not critical, since, without regard to size, the method ultimately reveals the conditions at which no Cr(VI) remains in the particles after treatment.

The unbound reducing agents can be removed by washing the treated material. The remaining particles can be abraded to remove surface-bound reducing agents (or related compounds) from the particle surfaces.

In a second aspect, the invention is a treatment process for reducing hexavalent chromium (Cr(VI)) trapped in a particulate COPR waste matrix, where the process comprises the sequential steps or acts of exposing the particulate COPR waste matrix to an amount of a first reducing agent (such as Fe(II), optionally in the form of $FeSO_4$) effective to at least partially solubilize (break down) the matrix and effective to at least partially chemically reduce the Cr(VI) to Cr(III), and when the chemical reduction has run its course, exposing the at least partially broken down matrix to a second reducing agent (such as sulfide ions, optionally in the form of sodium bisulfide) in an amount sufficiently high to diffuse into the COPR waste matrix particles and thereby reduce to Cr(III) the residual Cr(VI) trapped in the particles. In accord with the invention, the COPR waste matrix particles treated in the method are sized to permit convenient handling and effective diffusion of the second reducing agent into the particles. The reducing agents are provided in stoichiometric excess relative to the amount of Cr(VI) in the particulate waste matrix, which can be determined using the disclosed analytical method. To account for cost of materials, the minimal effective total dose of the two reductants, should preferably be used. To maximize efficiency of the treatment process, the second reducing agent can be added as soon as the first reducing agent has reacted with the waste matrix, typically just a few minutes (e.g., less than about 5 minutes, or less than about 2 minutes). As detailed below, an effective total reductant dose is contemplated in a typical case to be at least about a 1.5-fold to about a 2-fold stoichiometric excess of total reductants relative to amount of Cr(VI) in the waste matrix. As between the reductants, the amount of the second reducing agent is higher than the amount of the first. In particular, relative stoichiometric ratios of the second and first reductants of about 5-10 to 1 are suitable. The treatment would be effective at higher ratios, but cost considerations warrant limiting the amount of the second agent employed. Likewise, somewhat lower ratios can be sufficient to reduce the residual Cr(VI), but will prolong the duration of the treatment. In this application, the term "about" signifies up to a 5% variation from the stated number.

In some embodiments of the improved treatment process, a convenient matrix particle size is smaller than 1 inch (i.e., particles can pass through a 1 inch sieve). In some embodiments, the particles can pass through a 0.5 inch sieve. It will be understood that still smaller particles can be more readily treated in the method, but that for reasons of cost and efficiency, it is appropriate to employ particles in this size range or thereabouts. The particles for treatment in the method can be sized by crushing ex situ.

DETAILED DESCRIPTION

Figure 1:
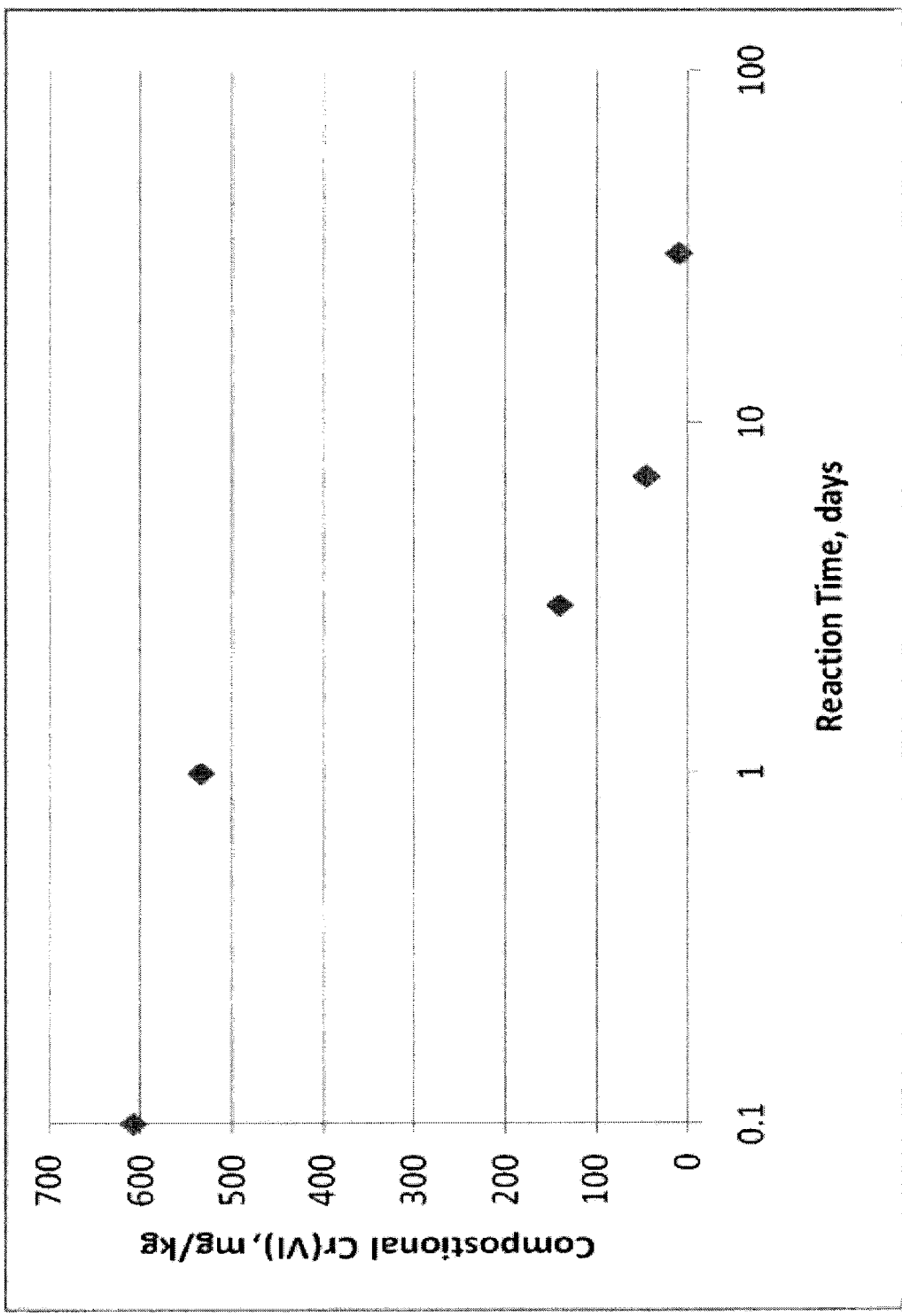
FIG. 1 illustrates compositional Cr(VI) content in sieved (large) particles over time treated with 5% ferrous sulfate heptahydrate and a 4% sodium bisulfide.

The instant invention is directed to a method of advantageously reducing substantially all of the Cr(VI) bound in the COPR waste matrix, by releasing some of the Cr(VI) bound in the COPR waste matrix or by treating substantially all of the unreleased Cr(VI) bound in the COPR waste matrix.

Evaluation of COPR treatments can be difficult. Analysis of the degree of effectiveness can be obscured by variables not accounted for in presently available methods. Various tests for measuring effectiveness may be used, such as alkaline extractable Cr(VI) (SW 846 Method 3060A), Toxicity Characteristic Leaching Procedure (TCLP) Cr (SW 846 Method 1311), Synthetic Precipitation Leaching Procedure (SPLP) Cr(VI) (SW 846 Method 1312).

As noted above, one difficulty associated with effective remediation of Cr(VI) from COPR is the inability to quantify the amount of Cr(VI) remaining in the COPR material after treatment. The analytical methods described herein overcome this problem by providing sample preparation steps that facilitate rapid and accurate analysis of compositional Cr(VI) levels in a COPR waste matrix.

The invention relates to the inventor's observation that residual Cr(VI) typically remains tightly packed in particulate COPR waste matrix material, even after treatment. While fine particles of very small diameter (e.g., particles that can pass through a 0.25 mm sieve) do not contain trapped Cr(VI), Cr(VI) remains inaccessible to reducing agents in larger particles for treatment or for quantitative analysis using, for example, the alkaline digestion test. As such, the most recalcitrant Cr(VI) is located inside such larger particles. Whether employed in a lab-scale setting in advance of a field-scale treatment or as a monitor of field-scale treatment outcome, the analytical method described herein selects these large unreacted particles for analysis as reliable indicators for overall treatment progression. Minute amounts of Cr(VI) in the treated material might not be associated with the large particles and as such is not considered in monitoring COPR Cr(VI) remediation. The disclosed methods can be used as an indicator that if all of the Cr(VI) in the larger particles has been treated, then the inference is that all of the Cr(VI) in the waste has been treated. It is highly improbable that Cr(VI) could be present in the abraded material after all the Cr(VI) in the interior of the larger particles has been treated.

In the following discussion of the methods, the first and second reducing agents employed are Fe(II) and sulfide ions, provided in the form of $FeSO_4$ and sodium bisulfide, respectively. The skilled artisan can readily adapt the disclosure to employ other reducing agents to reduce Cr(VI), such as other sources of ferrous iron or reduced sulfur species. The reducing activities of, and interactions between, these agents in COPR waste matrix treatment are known. In one possible treatment, iron sulfide (FeS) forms in situ and precipitates on the surface of waste particles. In accord with this method, the treated material is washed to remove unbound reducing agents and unbound FeS. The material is then passed through a sieve (of about 0.25 mm to about 0.5 mm) to isolate COPR particles which are then subjected to gentle abrasion, e.g., with a metal spatula, to remove the surface layer of FeS and repeated washing with deionized water. The skilled artisan can readily adapt the disclosure to employ other fine sieve sizes to isolate particles that contain unreacted Cr(VI) from the finer material in which Cr(VI) has been reduced. As noted, the vast majority of unreacted Cr(VI) is contained within these particles because unprotected surface Cr(VI) is readily accessible to treatment reagents. Consequently, little, if any, residual Cr(VI) is removed during the particle surface abrasion step. Effective removal of surface FeS can be monitored visually as the FeS forms a dark black coating on the lighter-colored COPR particles. The samples are washed and abraded until the FeS coating has been removed. The abraded particles are then dried (e.g., in an oven at 105° C.) and ground to a fine powder. The ground, dried samples are further washed with deionized water to remove excess dissolved sulfide ions that may be present in the pores of the solid. The water can be heated to accelerate diffusion of the sulfide ions from the ground particles. The samples are then analyzed for compositional Cr(VI), for example using the alkaline digestion test (SW846 Method 3060A).

Table 1 illustrates an example of the effectiveness of this analytical method, compared to conventional methods. COPR samples were treated with varying ferrous sulfate ($FeSO_4 \cdot 7H_2O$) and sodium bisulfide (NaHS) concentrations, as shown. Residual Cr(VI) levels were measured either with conventional methods, i.e., without isolation of large particles ("unsieved"), or with the disclosed methods that include separation of large particles. Conventional detection methods indicated compositional Cr(VI) values below detection limits (<1 mg/kg) in COPR at all treatment conditions, suggesting complete Cr(VI) remediation from the COPR. In contrast, the disclosed method revealed large amounts of Cr(VI) left behind in the large particles following most of the tested treatment conditions. Cr(VI) values of over 1000 mg/kg were revealed using the disclosed methods, while conventional methods showed no remaining Cr(VI) in the sample.

The disclosed methods also revealed important trends with regard to both treatment time and dosage. Measuring Cr(VI) content in sieved particle according to the disclosed methods revealed that Cr(VI) content decreased with time for all doses tested, except for the lowest dose which did not contain sufficient reductant to reduce all the Cr(VI) in the sample. An example of such trend is illustrated by FIG. 1 for treatment with 5% ferrous sulfate heptahydrate and a 4% sodium bisulfide. This graphic representation suggests a first order reaction as the results are roughly linear when plotted as log time versus compositional Cr(VI) level.

Figure 2:
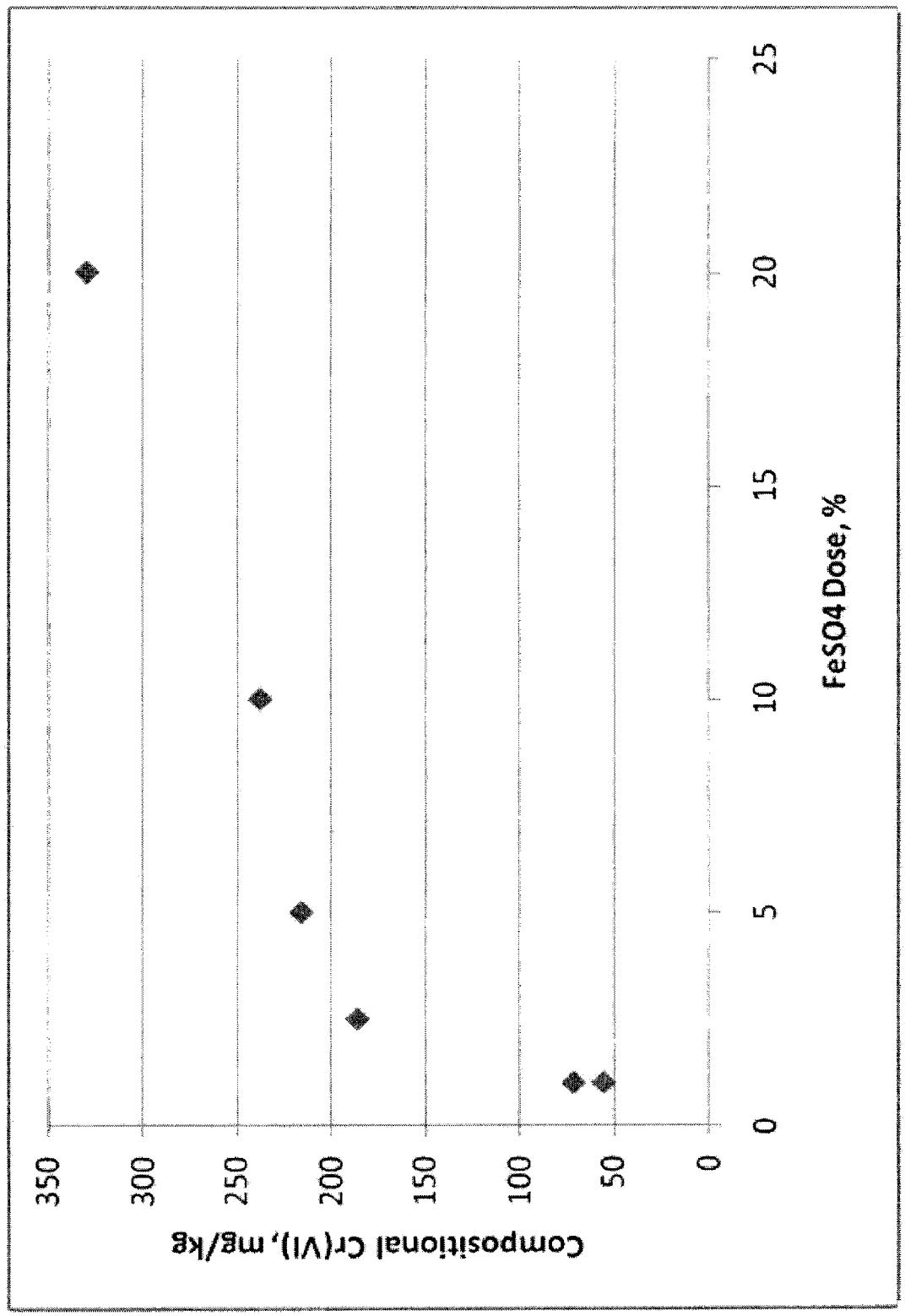
FIG. 2 illustrates compositional Cr(VI) content in sieved (large) particles after 1 day reaction time with 4% sodium bisulfide and varying ferrous sulfate concentrations.
Figure 3:
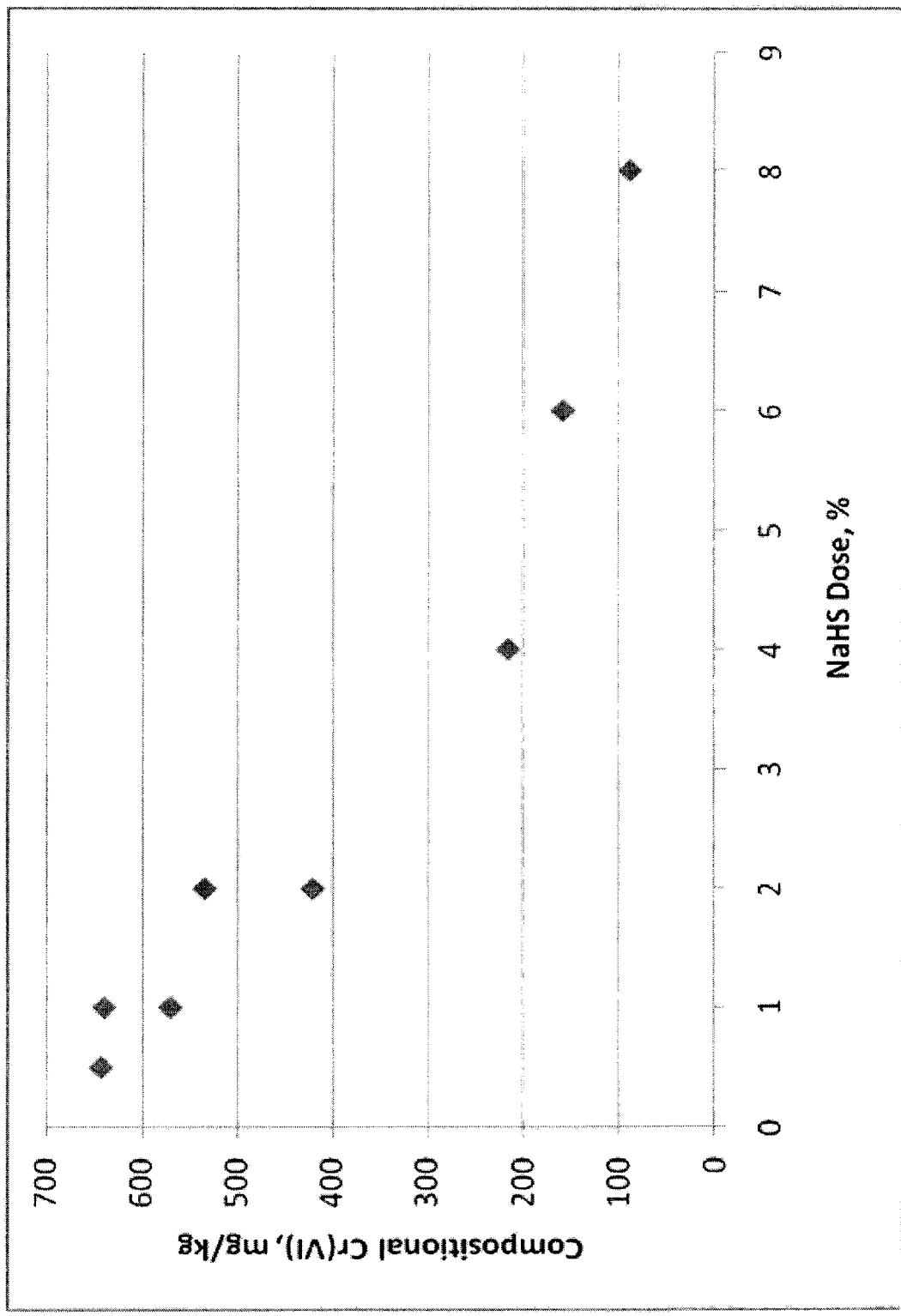
FIG. 3 illustrates compositional Cr(VI) content in sieved (large) particles after 1 day reaction time with 5% ferrous sulfate heptahydrate and varying sodium bisulfide concentrations.

Measuring Cr(VI) content in sieved particles according to the disclosed methods also revealed that increasing ferrous iron concentration inhibits, rather than advances, Cr(VI) reduction. FIG. 2 illustrates this finding. Compositional Cr(VI) value is plotted versus increasing ferrous sulfate concentrations at constant sulfide concentration and treatment time. The methods also revealed that increasing sulfide concentrations at a constant ferrous sulfate concentration and treatment time, results in enhanced Cr(VI) remediation, i.e., decreased compositional Cr(VI) content in treated particles (FIG. 3).

Table 1: Compositional Cr(VI) in unsieved COPR and in isolated large COPR particles, for varying ferrous sulfate and sodium bisulfide doses and after varying reaction times.

TABLE 1

| Dose | | Cr(VI) in unsieved COPR, mg/kg | Cr(VI) in COPR based on Sieved Solids, after time, mg/kg | | | | |
|---|---|---|---|---|---|---|---|
| $FeSO_4$—$7H_2O$ Untreated | NaHS | | 0.1 Day. | 1.0. | 3.0 | 7.0/10.0 | |
| | | | 5400 | | | 30 | 150 |
| 1.0 | 1.25 | <1 | 393 | 221 | 121 | 115 | 90. | 131 |
| | 2.5 | <1 | 188 | 94 | 90 | 67 | 69 | 42 |
| | 4.0(a) | <1 | 166 | 71 | 57 | 30 | 17 | <1 |
| | 4.0(b) | <1 | 75 | 55 | 2 | <1 | 31 | <1 |
| 2.5 | 2.0 | <1 | 659 | 371 | 288 | 142 | | |
| | 4.0 | <1 | 538 | 186 | 203 | 51 | | |
| | 6.0 | <1 | 437 | 124 | 133 | <1 | | |
| | 8.0 | <1 | 270 | 106 | 1 | <1 | | |
| 5.0 | 0.5 | <1 | 946 | 642 | 191 | 112 | 51 | |
| | 1.0 | <1 | 704 | 570 | 190 | 128 | 38 | |
| | 1.0 | <1 | 875 | 639 | 209 | 119 | 39 | |
| | 2.0 | <1 | 608 | 534 | 140 | 45 | 9.5 | |
| | 2.0 | <1 | 552 | 421 | 564 | 216 | | |
| | 4.0 | <1 | 456 | 216 | 149 | 120 | | |
| | 6.0 | <1 | 290 | 159 | 113 | 48 | | |
| | 8.0 | <1 | 240 | 89 | 99 | <1 | | |
| 7.5 | 1.0 | <1 | 950 | 645 | 156 | 102 | 87.5 | |
| 10 | 0.5 | <1 | 1130 | 570 | 350 | 289 | 244 | |
| | 1.0 | <1 | 1020 | 500 | 315 | 330 | 194 | |
| | 2.0 | <1 | 791 | 397 | 160 | 316 | 125 | |
| | 4.0 | <1 | 56 | 238 | 66 | 146 | 73 | |
| 20 | 1.0 | <1 | 847 | 490 | 253 | 333 | 157 | |
| | 2.0 | <1 | 701 | 384 | 198 | 298 | 119 | |
| | 4.0 | <1 | 522 | 330 | 156 | 261 | 97 | |

The disclosed methods can be used to quantify residual Cr(VI) in COPR before and after remediation. The disclosed methods can also be used to evaluate treatment progression, for example, by taking successive samples throughout repeated treatment. The disclosed methods can also be used to assess the reaction kinetics of Cr(VI) reduction for varying treatment parameters. The methods are superior to those known in the art because the particle separation steps permits analysis of residual Cr(VI) without masking the untreated Cr(VI) by the treatment reagents present in the fine fraction of the samples. Using these methods to analyze reaction kinetics during treatment has allowed targeted modification of treatment parameters and, thereby, optimization of the treatment process, which had not been possible prior to use of the inventive methods.

These results demonstrate that the disclosed methods allowed insights into reactions occurring during the COPR treatment that cannot be revealed using conventional measuring methods of unseparated samples. As demonstrated by the results described above, analysis of unseparated samples using conventional compositional analysis (SW846 Method 3060A) does not accurately determine the amount of unreacted Cr(VI) present in the interior of the particles in the waste due to masking by excess reductant in the waste. Conventional methods also did not reveal the slow reaction occurring in the larger particles in the COPR, during which Cr(VI) continues to be reduced to Cr(III), and that this reaction is enhanced by the addition of sulfide, but not by ferrous iron. The results further demonstrate that the most effective treatment involves a high sulfide to iron ratio. Residual Cr(VI) in large particles and within the COPR can be reduced to very low concentrations using high sulfide-low iron conditions.

The findings obtained using the disclosed methods are important in devising effective COPR remediation strategies using ferrous iron and sulfide. Because slow reactions occur over time (for days or weeks) inside the larger particles, particle size reduction is important for enhancing the treatment process. Controlling the relative ferrous iron and sulfide ratio further provides a novel treatment method having enhances effectiveness. In-situ treatment processes, such as those taught by Higgins, do not allow for controlling ferrous iron to sulfide ratios because Higgins injects the reagents underground and therefore cannot effectively control treatment of the Cr(VI) in the interior of the particles.

I claim:

1. A method for determining compositional hexavalent chromium (Cr(VI)) level in a sample of a particulate COPR waste matrix treated with reducing agents to reduce hexavalent chromium in the waste matrix, the method comprising the steps of:
    (a) removing from the treated COPR waste matrix particles free of Cr(VI) while retaining other particles;
    (b) abrading and washing the retained particles to remove particulate reducing agents from the retained particles and unbound reducing agents; and
    (c) determining the compositional Cr(VI) level in the washed particles.

2. The method of claim 1, wherein the removing step comprises passing the Cr(VI)-free particles through a sieve to remove them from other matrix particles.

3. The method of claim 2, wherein the sieving entails passing the Cr(VI)-free particles through a 0.25 mm sieve.

4. The method of claim 1, wherein the particulate reducing agents are characterized by a dark black coating on the particles and wherein removal of the particulate reducing agents is evidenced by removal of the coating.

5. The method of claim 1, wherein the determining step comprises an alkaline digestion test of the washed particles.

6. The method of claim 1, wherein the method further comprises the step of determining a total dose of all reducing agents and a relative dose of each reducing agent for treating the compositional Cr(VI) in the particulate COPR waste matrix.

7. The method of claim 1, wherein the reducing agents comprise ferrous iron and sulfide ions.

8. A method for reducing compositional hexavalent chromium in a particulate COPR waste matrix, the process comprising the sequential steps of:
    (a) at least partially solubilizing the particulate matrix and at least partially reducing Cr(VI) in the matrix to Cr(III) in the presence of a first reducing agent; and
    (b) further reducing Cr(VI) in the matrix to Cr(III) in the presence of a second reducing agent, wherein the first and second reducing agents together are provided in stoichiometric excess relative to the amount of compositional Cr(VI) in the matrix and wherein the second reducing agent is provided in stoichiometric excess relative to the first reducing agent.

9. The method of claim 8, wherein the amount of compositional Cr(VI) in the particulate COPR waste matrix is determined by a method comprising the steps of:
    treating a sample of the particulate COPR waste matrix with reducing agents to at least partially reduce Cr(VI) in the waste matrix;
    removing from the treated waste matrix particles free of untreated Cr(VI) while retaining other particles;
    abrading and washing the retained particles to remove dissolved and particulate reducing agents on the surface of the retained particles; and
    determining the compositional Cr(VI) level in the washed particles.

10. The method of claim 9, wherein the removing step comprises passing the Cr(VI)-free particles through a sieve to remove them from the remaining particles.

11. The method of claim 10, wherein the sieving entails passing the Cr(VI)-free particles through a 0.25 mm sieve.

12. The method of claim 9, wherein the particulate reducing agents form a dark black coating on the particles and wherein removal of the particulate reducing agents is evidenced by removal of the coating.

13. The method of claim 9, wherein the determining step comprises an alkaline digestion test of the washed particles.

14. The method of claim 9, wherein the method further comprises the step of determining a total dose of all reducing agents and a relative dose of each reducing agent for treating the compositional Cr(VI) in the particulate COPR waste matrix.

15. The method of claim 8, wherein the stoichiometric excess of the reducing agents together relative to the compositional Cr(VI) is between about 1.5:1 and 2:1.

16. The method of claim 8, wherein the stoichiometric excess of the second reducing agent relative to the first reducing agent is between about 5:1 and about 10:1.

17. The method of claim 8, wherein the method is carried out ex situ.

18. The method of claim 8, wherein particles of the particulate COPR waste matrix pass through a sieve having an opening size of between about 0.5 inch and one inch.

* * * * *